US006116201A

United States Patent [19]

LaBelle

[11] Patent Number: 6,116,201

[45] Date of Patent: Sep. 12, 2000

[54] IN-SOLENOID CHIP FOR UNDERTAKING PLURAL FUNCTIONS

[75] Inventor: James L. LaBelle, Murrieta, Calif.

[73] Assignee: Labken, Inc., San Marcos, Calif.

[21] Appl. No.: 09/317,685

[22] Filed: May 24, 1999

Related U.S. Application Data

[63] Continuation-in-part of application No. PCT/US99/02102, Feb. 1, 1999, which is a continuation-in-part of application No. 08/680,779, Jul. 16, 1996, Pat. No. 5,713,321, which is a continuation of application No. 08/577,977, Dec. 22, 1995, Pat. No. 5,564,376.

[51] Int. Cl.[7] .............................. B60R 25/04; F02N 11/08

[52] U.S. Cl. ...................... 123/179.2; 307/10.3; 307/10.6

[58] Field of Search .............................. 123/179.2, 179.3, 123/179.25; 307/10.3–10.6; 180/287; 290/38 R

[56] References Cited

U.S. PATENT DOCUMENTS

| | | | |
|---|---|---|---|
| 3,492,494 | 1/1970 | Clark et al. | 307/10.5 |
| 3,749,930 | 7/1973 | Roe | 307/10.5 |
| 4,141,332 | 2/1979 | Wyler | 123/179.2 |
| 4,209,709 | 6/1980 | Betton | 307/10.4 |
| 4,288,778 | 9/1981 | Zucker | 307/10.5 |
| 4,315,160 | 2/1982 | Levine | 307/10.3 |
| 4,533,016 | 8/1985 | Betton | 307/10.4 |
| 4,545,343 | 10/1985 | Cook et al. | 123/198 B |
| 4,607,312 | 8/1986 | Barreto-Mercado | 361/172 |
| 4,733,638 | 3/1988 | Anderson | 123/198 B |
| 4,896,637 | 1/1990 | Yamamoto | 123/179.3 |
| 5,079,436 | 1/1992 | Elkins | 307/10.3 |
| 5,191,228 | 3/1993 | Sloan | 307/10.3 |
| 5,224,567 | 7/1993 | Tomlinson | 180/287 |
| 5,381,128 | 1/1995 | Kaplan | 340/426 |
| 5,396,216 | 3/1995 | Morgan | 307/10.3 |
| 5,453,730 | 9/1995 | De-Grinis et al. | 340/426 |
| 5,513,105 | 4/1996 | Krones | 307/10.5 |
| 5,564,376 | 10/1996 | Labelle et al. | 123/179.3 |
| 5,635,916 | 6/1997 | Bucholtz et al. | 307/10.3 |
| 5,742,137 | 4/1998 | Bratton et al. | 123/179.3 |
| 5,821,631 | 10/1998 | Loraas et al. | 307/10.3 |

FOREIGN PATENT DOCUMENTS

| | | | |
|---|---|---|---|
| 2125814 | 12/1995 | Canada . | |
| 81/03002 | 10/1981 | WIPO | B60R 25/04 |
| WO 96/23970 | 8/1996 | WIPO | F02N 11/08 |

OTHER PUBLICATIONS

Publication: "The Global Market for Passenger Car Alternators and Starter Motors." EIU Components Business International, Chapter 5, pp. 74–87. 2nd Quarter, 1999.

Publication: "Integrated Starters." Automotive Engineer, pp. 49–52., vol. 23, No. 8. Sep. 1998.

Publication: "Focus on Electronics." Automotive Engineer, pp. 36–38. pp. 41–42 pp. 45–46, Jun. 1997.

Publication: "Mikrosystemtechnik im Kraftfahrzeug." Bosch Technische Berichte. pp. 27–35. 1996.

*Primary Examiner*—Andrew M. Dolinar

*Attorney, Agent, or Firm*—John L. Rogitz

[57] ABSTRACT

A vehicle antitheft system includes a MOSFET with associated power and logic circuitry embodied by a chip that can be housed within a starter solenoid housing for preventing control current from activating the solenoid unless an authorized enable signal is received. The enable signal can be transmitted by a hand-held rf transmitter. The chip can also undertake additional functions. In alternate embodiments, the MOSFET can be disposed in a housing separate from the solenoid and mounted near the solenoid, and the MOSFET can be controlled by an rf-generated enable signal or by an impulse-generated enable signal. In the latter case, the MOSFET is activated to close the solenoid control current circuit path only when a single impulse signal, e.g., from a door latch lock, is activated. If two impulse signals are received, one from, e.g., the door latch lock and another from, e.g., a locking mechanism/switch inside the vehicle, the MOSFET is not activated, to prevent a thief from actuating the system by breaking into the vehicle and unlocking the vehicle door from inside the vehicle.

26 Claims, 13 Drawing Sheets

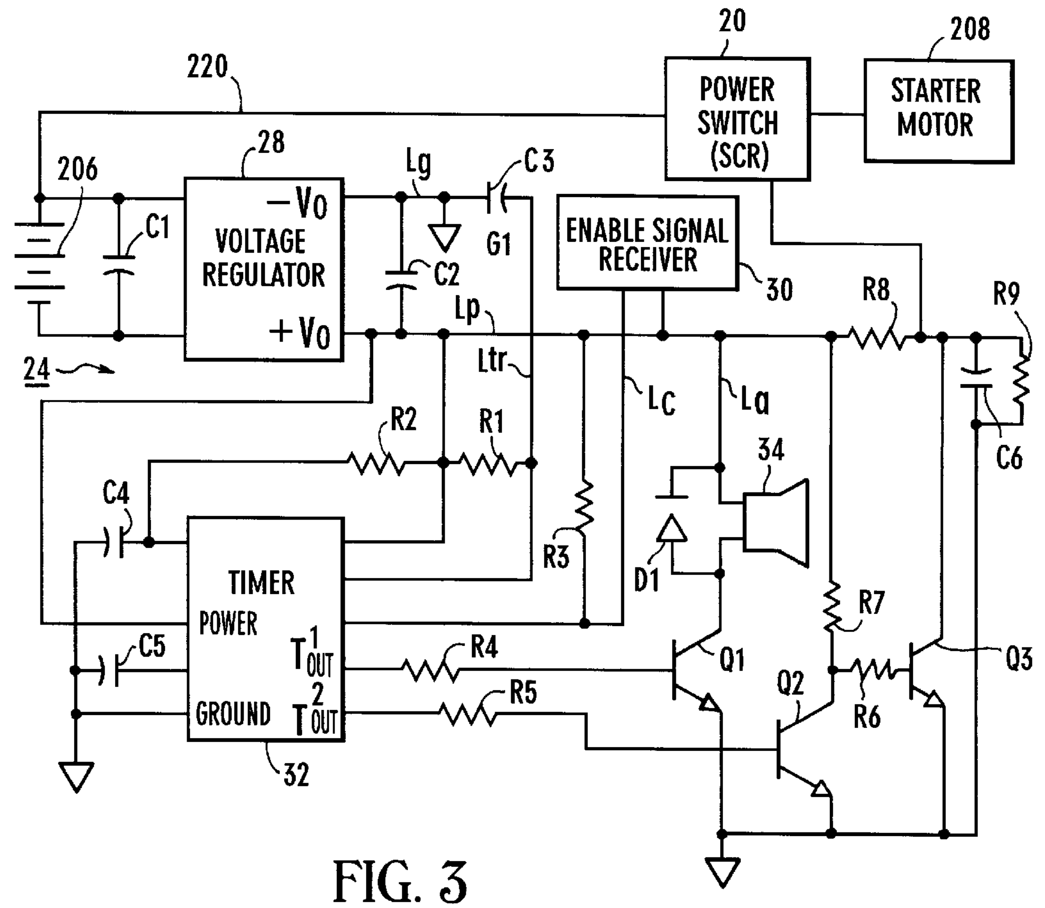
FIG. 3
FIG. 4
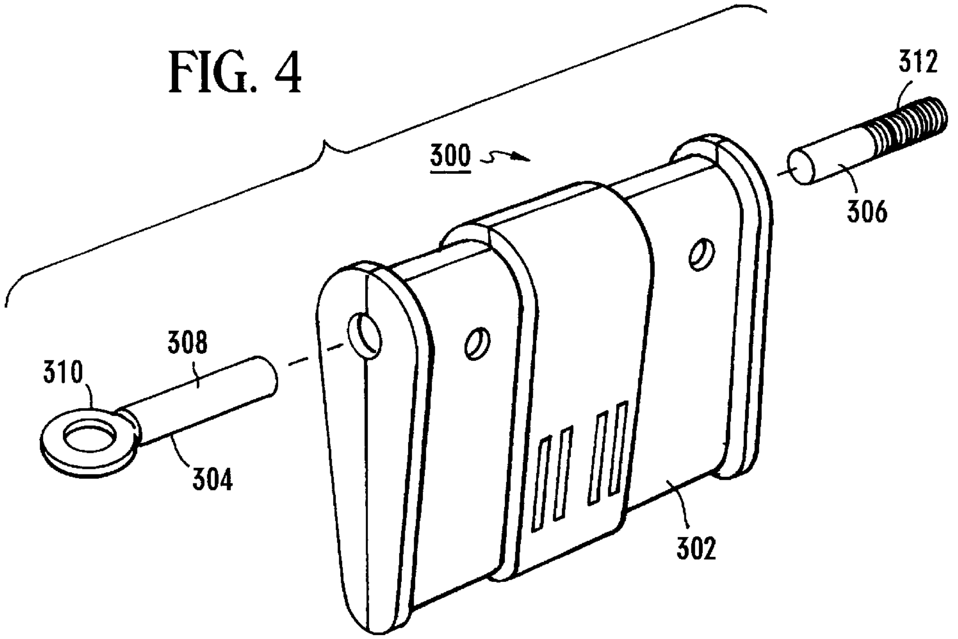

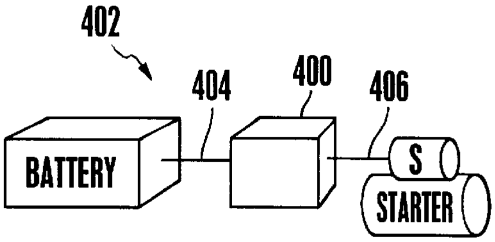
Fig. 5A
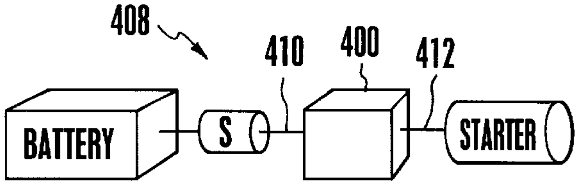
Fig. 5B
Fig. 6
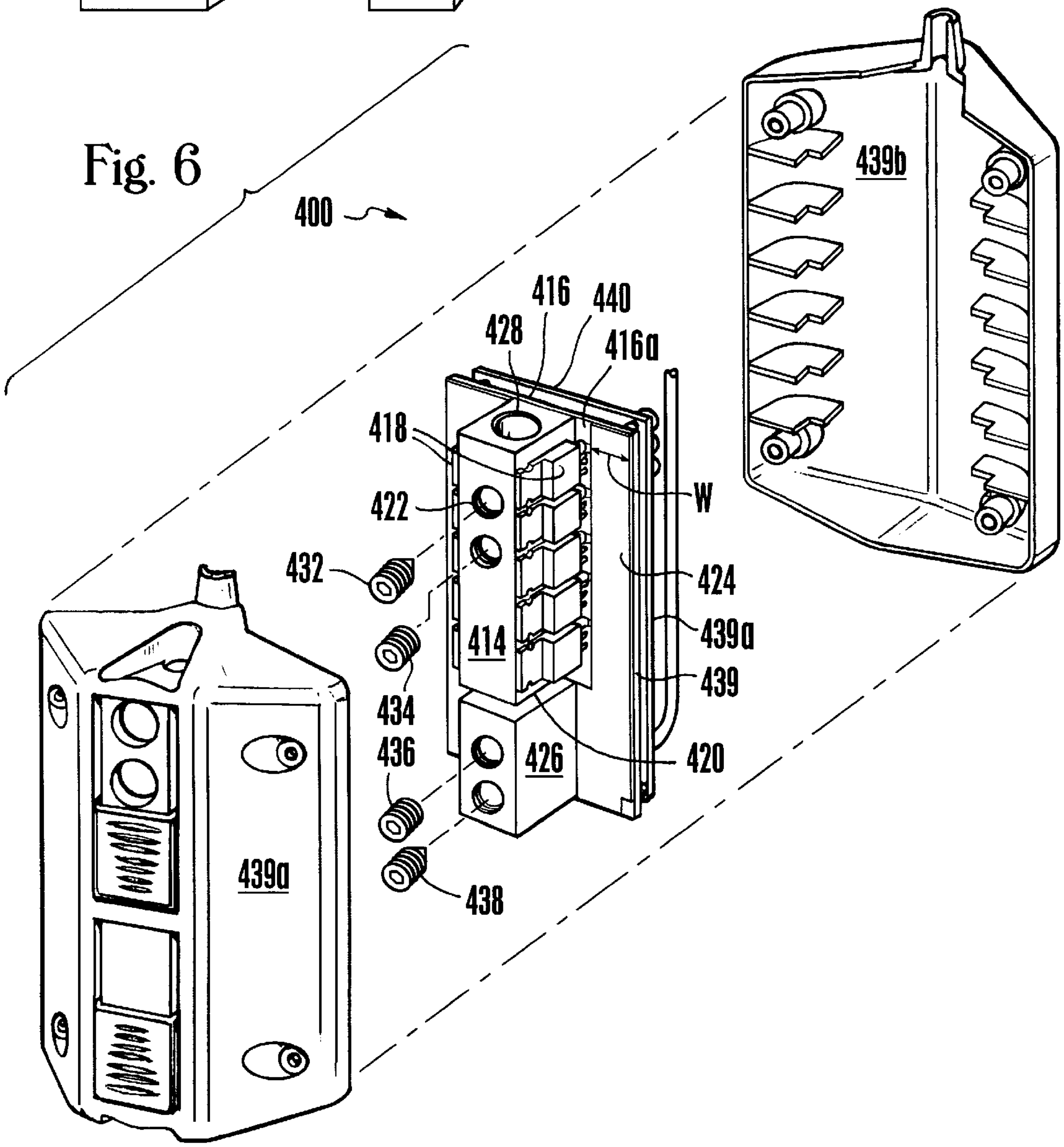

Fig. 11 POWER SWITCH CIRCUIT
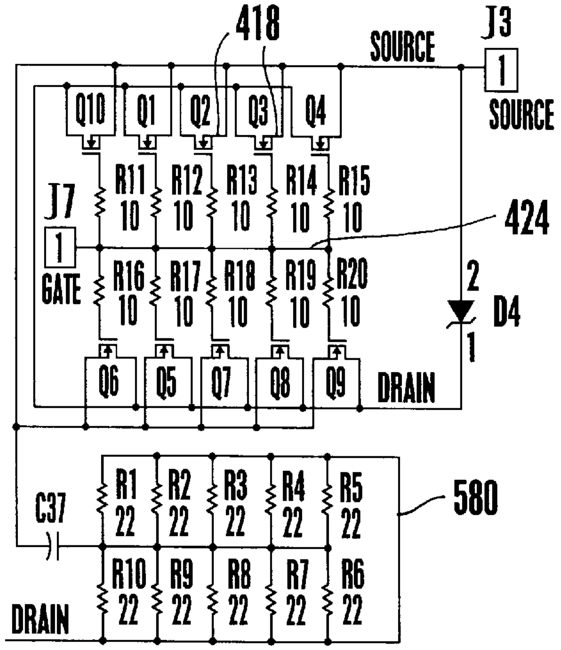
Fig. 12 ELECTRONIC POWER SUPPLY CIRCUIT
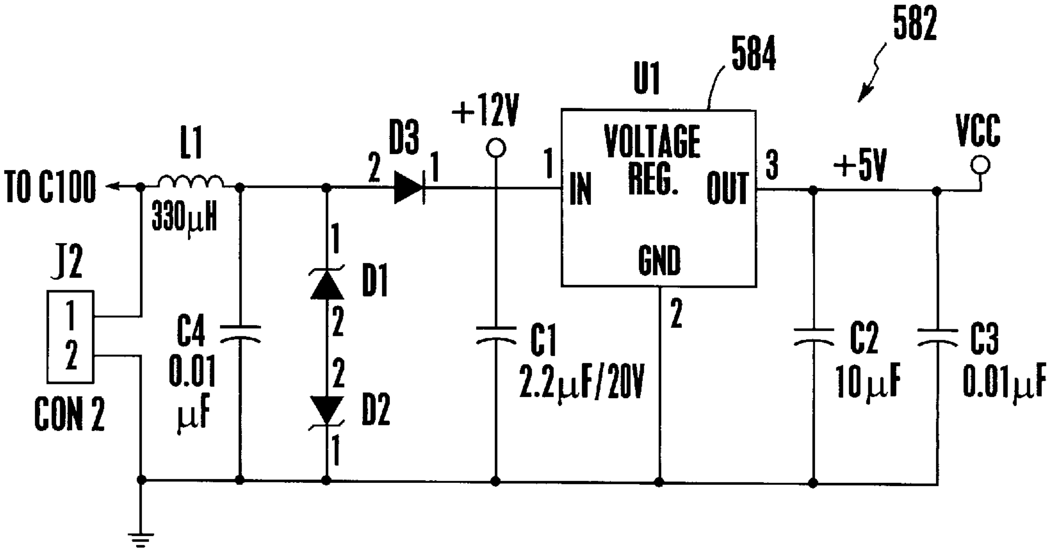

CONTROL CIRCUIT

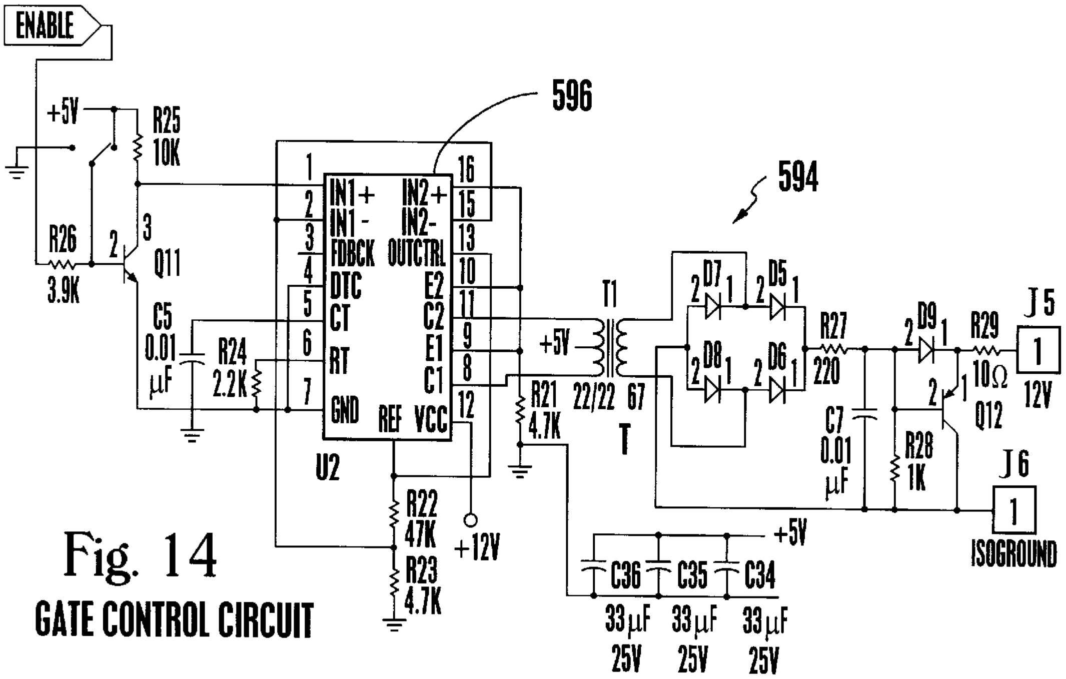
Fig. 14
GATE CONTROL CIRCUIT
Fig. 15
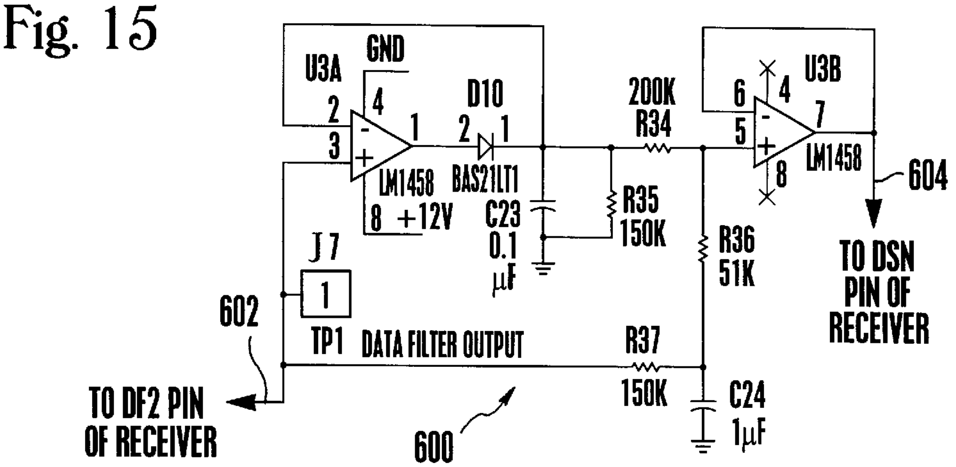

POWER CIRCUIT

CONTROL CIRCUIT

GATE CONTROL CIRCUIT

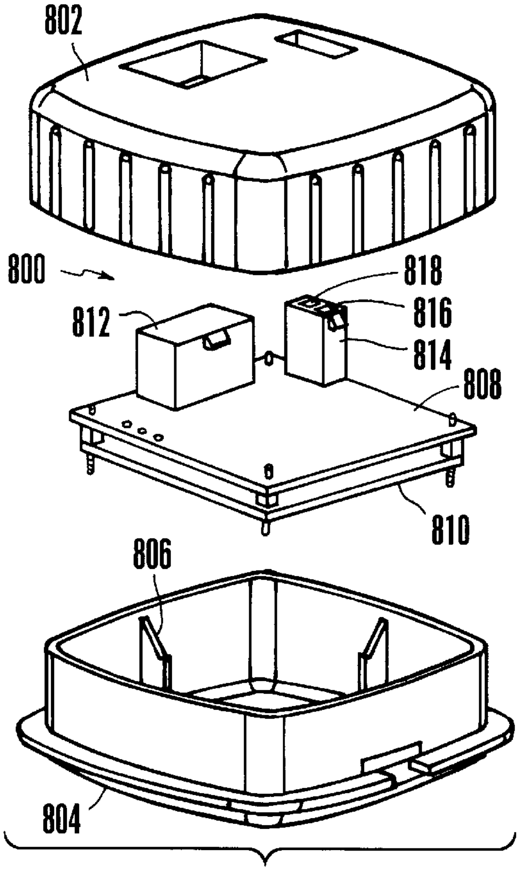
Fig. 20
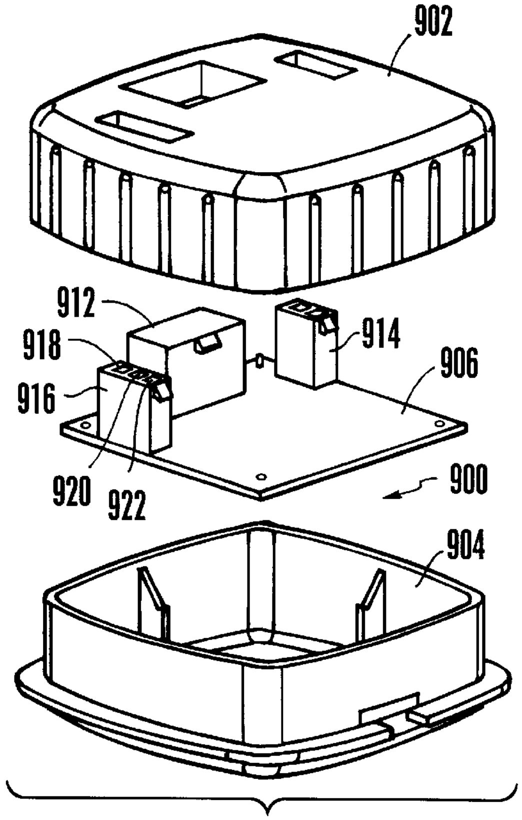
Fig. 21
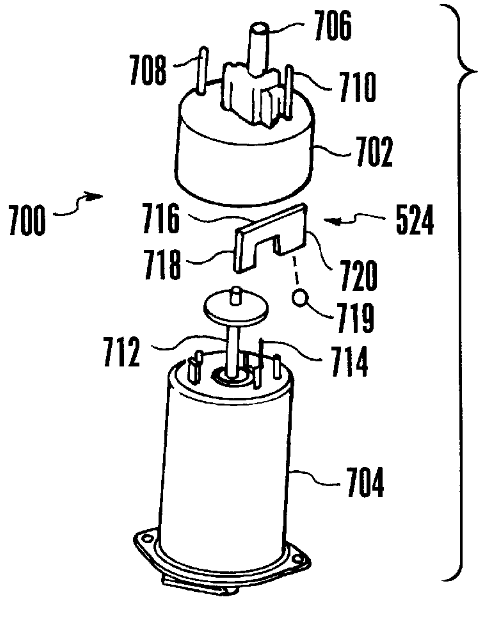
Fig. 19
Fig. 19A
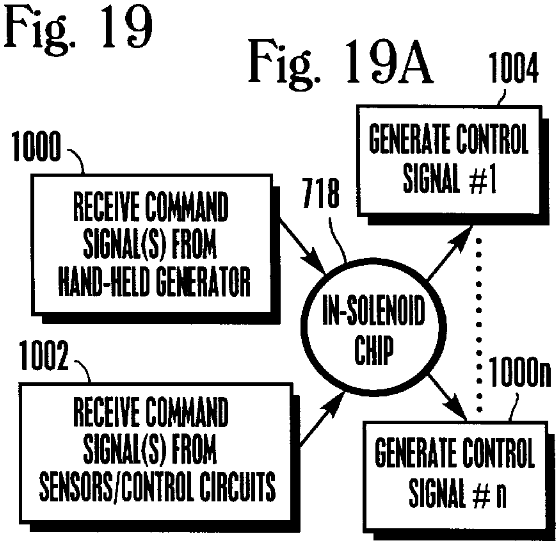

IN-SOLENOID CHIP FOR UNDERTAKING PLURAL FUNCTIONS

RELATED APPLICATIONS

The present application is a continuation-in-part of co-pending PCT application PCT/US99/02102, filed Feb. 1, 1999, which claims priority from co-pending U.S. patent application Ser. No. 09/020,585 for an invention entitled "Antitheft Interrupt System for Vehicle Starter Power Circuit" filed Feb. 2, 1998, which in turn is a continuation-in-part of U.S. patent application Ser. No. 08/680,779, now U.S. Pat. No. 5,713,321 for an invention entitled "Antitheft Interrupt System for Vehicle Starter Power Circuit" filed Jul. 16, 1996, which in turn is a continuation of U.S. patent application Ser. No. 08/577,977, now U.S. Pat. No. 5,564,376, filed Dec. 22, 1995, said applications and patents being assigned to the same assignee as the present invention, and incorporated herein by reference. The present invention claims priority from all of the above-referenced applications and patents.

FIELD OF THE INVENTION

The present invention relates generally to vehicles, and more particularly to override-resistant vehicle antitheft systems.

BACKGROUND

Vehicle antitheft systems have been provided that function by disabling a component in the ignition system of a vehicle unless a security code is transmitted to the system prior to starting the vehicle. An example of such a device is disclosed in U.S. Patent No. 4,733,638 to Anderson, which discloses a transmitting device that can be manually operated to energize a relay within the casing of a vehicle starter motor. In turn, the relay, once energized, closes an auxiliary contact that is also located in the casing of the starter motor to thereby complete the electrical path from the vehicle's battery to a conventional starter solenoid. In accordance with well-known principles, when the ignition key is rotated to close the ignition switch, the starter solenoid both engages the Bendix gear of the starter with the vehicle flywheel, and closes a conventional starter switch to complete the electrical path between the battery and the starter motor to turn the Bendix gear and flywheel, thereby starting the vehicle.

Accordingly, the Anderson device, like many if not most such antitheft systems, does not directly control power to a starter motor, but rather indirectly controls power to the starter motor by controlling power to the starter solenoid. A principal reason why power to the solenoid is controlled is that the electrical current drawn by the solenoid is much less than the current drawn by the starter motor, thus permitting the use of relatively small, inexpensive auxiliary contacts by the antitheft systems.

In our above-referenced U.S. Pat. No. 5,564,376, we recognized that while somewhat effective, existing antitheft systems have certain drawbacks. For example, because many of its components are located within the casing of the starter motor, the Anderson device mentioned above cannot be easily integrated with existing starter motors. Further, from the above discussion it will be appreciated that the Anderson device is intended for use with ignition systems wherein the solenoid is housed with the starter motor. Indeed, the Anderson device cannot be used in conjunction with ignition systems wherein the solenoid is not co-housed with the starter motor.

In our prior patents we have also recognized that antitheft systems which can disable a starter solenoid that is housed apart from the starter motor can be, under certain circumstances, relatively easy to defeat because the solenoid is typically mounted in a location on the vehicle that relatively easy to access, compared to accessing the starter motor, and requires the jumpering of a relatively small amount of current, compared to the current that must be jumpered to defeat a circuit element in the main power line to the starter motor. For these reasons, we have provided a vehicle antitheft system which can be easily and quickly mounted in a comparatively inaccessible location, i.e., on the starter motor casing, which is difficult to defeat by jumpering, and which can be used in conjunction with existing stock starter motors.

Nevertheless, the present invention recognizes that some users desire solenoid disablement instead of starter motor power interrupt, because it is easier and less expensive to disable a solenoid as opposed to interrupting the main power to the starter motor. As understood herein, past solenoid-based security systems, such as that disclosed in PCT application no. WO 81/03002 to Blais, have drawbacks including the failure to recognize the importance of voltage regulation in antitheft systems that are powered by sources such as car batteries that do not always produce constant voltages. Accordingly, the present invention provides embodiments that address these considerations. Moreover, the present invention understands that a solenoid-housed control chip advantageously can undertake functions in addition to the anti-theft function.

SUMMARY OF THE INVENTION

A starter solenoid includes a solenoid housing and a chip mounted in the housing. In accordance with the present invention, the chip includes logic for generating at least two control signals respectively useful for undertaking at least two functions.

In a preferred embodiment, the chip receives command signals and generates the control signals in response thereto. At least some command signals can be received from a hand held command signal generator, and other command signals can be received from sensors. As an example, an antitheft function can be undertaken by the chip. In this example, the activating coil of the solenoid has an input terminal, and the chip communicates with an antitheft system in the solenoid. The antitheft system includes at least one MOSFET in electrical series with the input terminal of the activating coil for actuating the solenoid upon receipt of a control signal from the chip. Other control signals generated by the chip can include: voltage regulation/control signals, voltage indication signals, remote start signals, multi-function disabling signals, positioning signals, low voltage protect signals, motion/impact alarm signals, tilt alarm signals, proximity signals, vehicle component control signals.

In another aspect, a combined antitheft system and control signal generator system for a starter solenoid of a vehicle includes at least one power switch in electrical series with a terminal of the activating coil of the solenoid for actuating the solenoid upon receipt of an anti-theft control signal. As intended by the present invention, the power switch is located in the housing. A logic chip is also in the housing for generating the anti-theft control signal and for generating at least one other control signal in addition to the anti-theft control signal.

In still another aspect, a starter solenoid includes a solenoid housing, an activating coil in the housing, and an antitheft system disposed in the solenoid housing. The antitheft system includes at least one power switch in electrical series with the activating coil for actuating the solenoid. Also, a chip is in the housing, and the chip contains at least a portion of the antitheft system. The chip generates at least one control signal useful by a system other than the antitheft system.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is an electrical schematic view of the control circuit;

FIG. 4 is an exploded perspective view of the housing of the present invention with mounting adapters;

FIG. 5A is a schematic diagram showing the cooperation of structure between the housing of the present invention and a vehicular starting current arrangement in which a starter motor has a solenoid combined integrally therewith;

FIG. 5B is a schematic diagram showing the cooperation of structure between the housing of the present invention and a vehicular starting current arrangement in which a starter motor is physically distanced from its associated solenoid;

FIG. 6 is an exploded perspective view of the housing shown schematically in FIGS. 5A and 5B;

FIG. 11 is an electrical schematic diagram of the power switches shown in FIG. 6;

FIG. 12 is an electrical schematic diagram of the power supply circuit for the electronic components of the device shown in FIG. 6;

FIG. 14 is an electrical schematic diagram of the gate control circuit for the device shown in FIG. 6;

FIG. 15 is an electrical schematic diagram of the receiver filter and adaptive slicer circuit;

FIG. 19 is an exploded perspective view of the present system integrated within a solenoid housing;

FIG. 19A is a schematic representation of the multi-function logic executed by the chip shown in FIG. 19;

FIG. 20 is an exploded perspective view of the present system as intended for externally mounted engagement with a solenoid;

FIG. 21 is an exploded perspective view of an alternate system as intended for externally mounted engagement with a solenoid.

DETAILED DESCRIPTION OF THE PREFERRED EMBODIMENT

Figure 1:
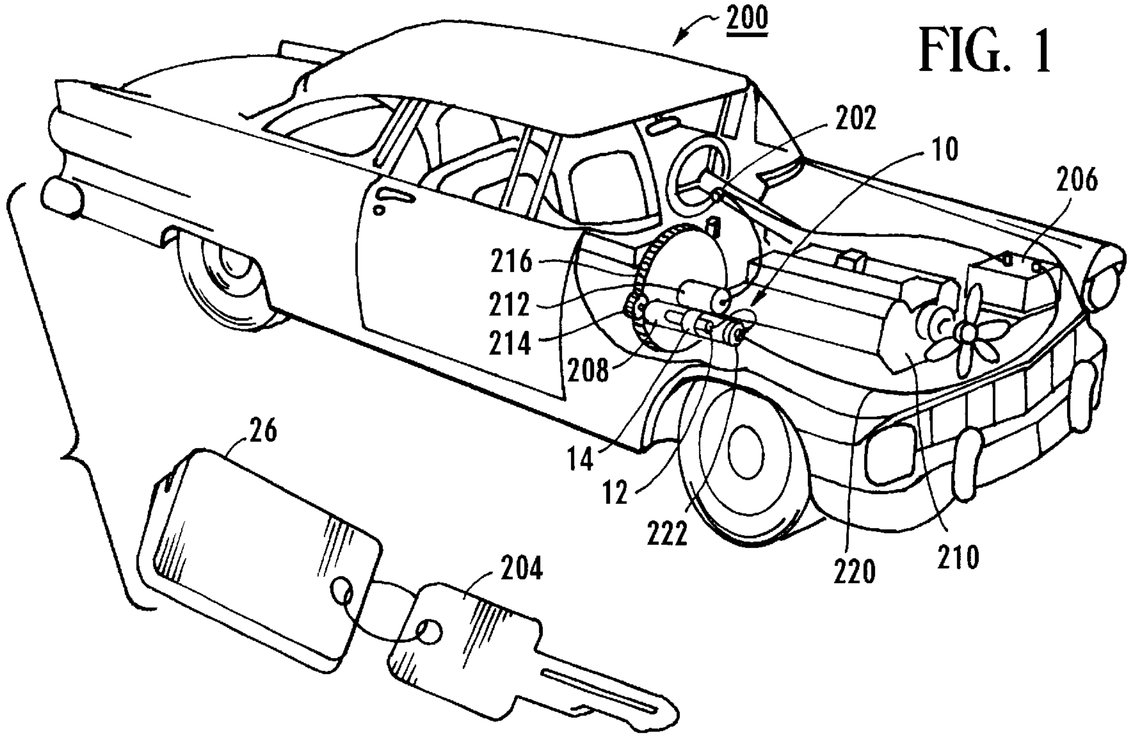
FIG. 1 is a perspective view of the antitheft system of the present invention, shown in its intended environment, with portions cut away for clarity.

Referring initially to FIG. 1, the intended environment of the present invention can be seen. A motor vehicle, generally designated 200, includes an ignition switch 202 that can be closed by means of a key 204 to complete the electrical path between a battery 206 and a starter motor 208 and thereby start the engine 210 of the vehicle 200. Specifically, in a conventional ignition system, when the ignition switch 202 is closed, a starter solenoid 212 is electrically connected to the battery 206, energizing the solenoid 212. In turn, the solenoid 212 engages a so-called Bendix gear 214 with the flywheel 216 of the vehicle 200. Also, in a conventional ignition system the solenoid 212 closes a starter switch 218 (FIG. 2) in a starting current power line 220 to complete the electrical circuit between the battery 206 and the starter motor 208. Thereby, the starter motor 208, which is coupled to the Bendix gear 214, is caused to rotate the Bendix gear 214 and, hence, the flywheel 216, starting the engine 210.

It will be appreciated that the current flowing through the starting current power line 220 must be relatively high to generate the torque necessary to turn the flywheel 216. The intention of the present invention is to interpose an antitheft system, which is responsive to a coded signal, in the starting current power line 220 between the battery 206 and the starter motor 208. Consequently, as the present invention recognizes, jumpering of the antitheft system is made difficult in that relatively high starting current must be jumpered to do so. Further, in the preferred embodiment the antitheft system of the present invention is physically juxtaposed with the starter motor 208, which is typically located in a location that is difficult to access. By "physically juxtaposed" is meant that the antitheft system is mounted on or within a few inches of the starter motor 208. Consequently, physically tampering with the present antitheft system is inhibited.

Figure 2:
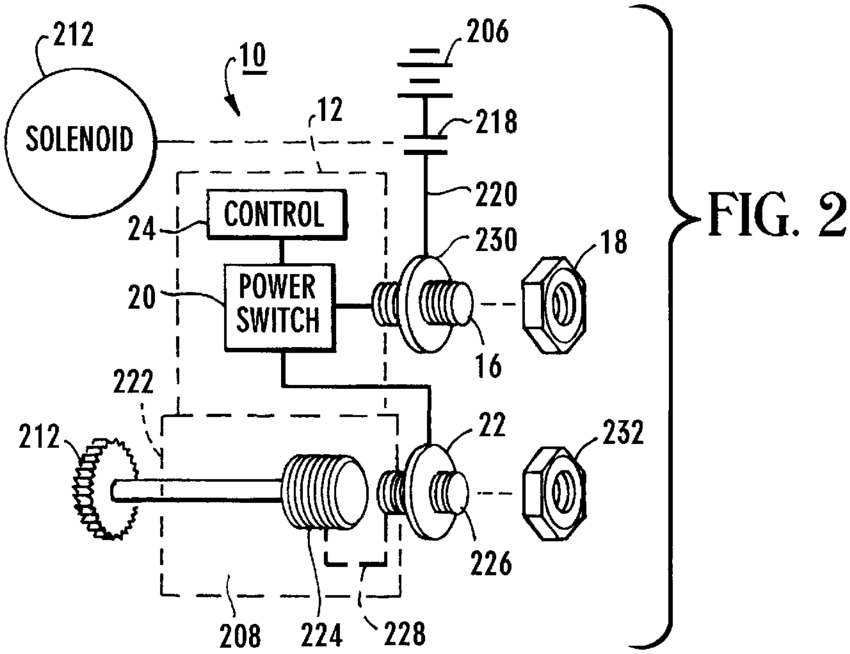
FIG. 2 is a partially schematic view of the antitheft system of the present invention, with portions shown in phantom.

With the above disclosure in mind, in cross-reference to FIGS. 1 and 2 an antitheft system, generally designated 10, includes a hollow plastic or metal housing 12 that is mounted on a casing 222 of the starter motor 208 by appropriate means. As but one example of how the housing 12 can be mounted on the starter motor casing 222, a bracket 14 (FIG. 1) is surroundingly engaged with the housing 12 and casing 222 to clamp the housing 12 against the casing 222.

Alternatively, referring briefly to FIG. 4, an antitheft system, generally designated 300, includes a housing 302. The system 300 shown in FIG. 4 is in all essential respects identical in configuration and operation to the system 10 shown in FIGS. 1–3, except that the housing 302 can be juxtaposed with a starter motor casing by means of rigid metal mounting adapters 304, 306. More specifically, a starter/solenoid adapter 304 includes an elongate electrically conductive shank 308 that is in electrical contact with components within the housing 302 in accordance with principles discussed below, and the adapter 304 includes a hollow eye 310 on the end of the shank 308 that is opposed to the housing 302. It will readily be appreciated that the eye 310 can be fastened to a starter solenoid lug in electrical contact therewith, both to support the housing 302 and to effect electrical communication between the starter/solenoid and the components within the housing 302. Likewise, a rigid elongate electrically conductive battery adapter 306 is in electrical contact with components within the housing 302 in accordance with principles discussed below, and the adapter 306 includes a partially threaded end 312 that is opposed to the housing 302 for establishing a lug onto which a battery cable can be fastened, to further support the housing 302 and to effect electrical communication between the battery and the components within the housing 302.

Referring back to FIG. 2, the starter motor 208 includes windings 224 that are electrically coupled to an externally threaded power terminal 226, as indicated by the dashed line 228. The power terminal 226 extends outwardly from the casing 222. In accordance with well-known principles, the power terminal 226 establishes a means by which the battery 206 can be electrically connected to the starter motor 208 to energize the windings 224, thereby activating the starter motor 208 to turn the Bendix gear 212.

FIG. 2, however, shows that instead of connecting the starting current power line 220 directly to the power terminal 226 of the starter motor 208 as in a conventional ignition system, per the present invention the power line 220 is connected to an externally threaded terminal 16 of the antitheft system 10 by means of a battery connector 230. As can be appreciated in reference to FIG. 2, the battery connector 230 is held onto the terminal 16 in electrical contact therewith by a nut 18 that is threadably engaged with the terminal 16.

In turn, the terminal 16 is electrically connected to a power switch 20 that is disposed in the housing 12. Additionally, FIG. 2 shows that the power switch 20 is electrically connected to a starter connector 22. As can be appreciated in reference to FIG. 2, the starter connector 22 is held onto the power terminal 226 of the starter motor 208 in electrical contact therewith by a nut 232 that is threadably engaged with the power terminal 226.

Thus, in accordance with the present invention and as shown in FIG. 2, the power switch 20 is connected in electrical series in the starting current power line between the battery 206 and the starter motor 208. Consequently, in the present invention the starter motor cannot receive current from the battery 206, even when the starter switch 218 of the vehicle 200 is closed, unless the power switch 20 is also closed. Furthermore, as described below, the power switch 20 closes to complete the electrical circuit between the battery 206 and starter motor 208 only when a control circuit 24 in the housing 12 receives an enable signal from an enable signal generator 26 (FIG. 1).

Advantageously, the enable signal generator 26 is a hand-held (and thus portable) manipulable device which can be conveniently coupled to the key 204. In one embodiment, the generator 26 is a radiofrequency (rf) amplitude modulated (AM) transmitter model No. TX-99K, made by Ming, or a transmitter made by Place. When appropriately manipulated, the generator 26 broadcasts a coded enable signal to the control circuit 24 to close the power switch 20. If desired, the control circuit 24 can be "trained" to accept the code of a preexisting rf transmitter that is concurrently used for, e.g., remotely opening the door locks of the vehicle 200 as a person approaches the vehicle 200.

FIG. 3 shows the details of one control circuit 24, it being understood that certain figures below show an alternate circuit of the present invention. If desired, the circuits of the present invention can be embodied as application specific integrated circuit (ASIC) chips. Alternatively, for low power solenoid applications the circuits can be implemented within a ceramic substrate, with the present power switch being established within the substrate. As yet another alternative, the power devices and/or control chips/circuits described below can be established by raw silicon wafers which are bonded to a ceramic substrate and the bond wire connected directly to the substrate.

As shown, a voltage regulator 28 is connected in parallel with the battery 206 to hold the gate drive voltage constant at +12 volts dc regardless of input voltage, and to restrict the voltage drop across the device at or below a threshold voltage, preferably less than ¼ volt dc. The regulator 28 includes a twelve volt power output port $+V_o$ that is connected to a control circuit power line $L_p$. Also, the regulator 28 includes a ground port $-V_o$ that is connected to a control circuit ground line $L_g$ having an isolated ground G1. In accordance with the present invention, the regulator 28 maintains a constant voltage in the control circuit 24 while the power switch 20 is closed and the engine 210 is cranking during start-up. In one embodiment, the voltage regulator 28 is a type 4007 12 volt power module made by Burr-Brown.

As shown in FIG. 3, an input capacitor C1 is connected in parallel with the battery 206 and the input ports of the regulator 28. Also, an output capacitor C2 is connected in parallel with the output port $+V_o$ and ground port $-V_o$ of the regulator 28. Example values of the resistors and capacitors of the present invention are set forth in Table 1 below.

An enable signal receiver 30 is connected to the power line $L_p$. In one embodiment, the receiver 30 is a type RE-99 receiver made by Ming. More preferably, the present receiver is a type KESRX01 receiver made by Plessey operating at three hundred fifteen million Hertz (315 MHz) that uses a quarter wave monopole antenna. In accordance with the present invention, the receiver 30 receives the enable signal from the enable signal generator 26 (FIG. 1), and in response sends a control signal to a timer 32 via a control signal line $L_c$.

The timer 32 can be a chip trigger timer, and more specifically a type 556 dual timer made by, e.g., National Semiconductor. Accordingly, the skilled artisan will recognize that the timer 32 receives a relatively short duration control signal from the receiver 30 and outputs a relatively longer duration output pulse at first and second output ports $T_{out}^1$ and $T_{out}^2$.

As shown in FIG. 3, the timer 32 is connected to the ground line $L_g$ via a timer regulator line $L_{tr}$ and a capacitor C3. Additionally, the timer 32 is connected to a first time delay capacitor C4 as shown, and the first time delay capacitor C4 is connected to the timer regulator line $L_{tr}$ via two resistors R1, R2. A second time delay capacitor C5 is connected between the timer 32 and ground in parallel with the first time delay capacitor C4. Moreover, as shown a ground port GND of the timer 32 is connected directly to ground, while a power port PWR of the timer 32 is connected to the power line $L_p$. In the embodiment shown, a resistor R3 is connected between the power line $L_p$ and the control signal line $L_c$.

As intended by the present invention, the timer 32 in combination with the time delay capacitors C4, C5 resistors R1, R2 establishes a time delay circuit that defines a predetermined enable period, during which period the power switch 20 is closed as further disclosed below. In one embodiment, the predetermined enable period is about one minute in length. Additionally, the receiver 30 with resistor R3 establishes a trigger circuit for triggering the timer 32 to output voltages at the output ports $T_{out}^1$ and $T_{out}^2$. It is accordingly to be understood that the output voltages are generated at $T_{out}^1$ and $T_{out}^2$ only during the entire enable period.

Continuing with the description of the control circuit 24 shown in FIG. 3, the first output port $T_{out}^1$ is connected to the base of a type 2N2222 alarm transistor Q1 via a resistor R4. In turn, the collector of the alarm transistor Q1 is connected to an audible alarm 34. A type 1N4001 protect diode D1 is connected in parallel to the alarm 34 as shown. In one presently embodiment, the alarm 34 is a piezoelectric beeper that emits a beeping sound during the predetermined enable period. As shown, the alarm 34 is connected to the power line $L_p$ via an alarm line $L_a$, with the emitter of the alarm transistor Q1 being connected to ground.

FIG. 3 also shows that the second output port $T_{out}^2$ is connected to the base of a type 2N2222 driver transistor Q2 via a resistor R5. In turn, the collector of the driver transistor Q2 is connected to the base of a type 2N2222 power switch transistor Q3 via a resistor R6. As also shown, the collector of the driver transistor Q2 is connected to the power line $L_p$ via a resistor R7, and the collector of the power switch transistor Q3 is connected to the power line $L_p$ as well, with a resistor R8 separating the connections of the transistors Q2, Q3 to the power line $L_p$. The emitters of both the driver transistor Q2 and power switch transistor Q3 are connected to ground as shown. In the circuit shown, an RC circuit including a capacitor C6 and resistor R9 is connected between ground and the power line $L_p$.

As shown in FIG. 3, the power switch 20 is connected to the power line $L_p$ between the resistor R8 and the RC circuit established by the capacitor C6 and resistor R9 for controlling the power switch 20. The power switch 20 can be a solid state power switch, such as a field effect transistor, bipolar transistor, or silicon controller rectifier (SCR). As recognized by the present invention, by making the power switch 20 an SCR, repeated reliable cycling of the power switch 20 is facilitated, notwithstanding the fact that it must pass the relatively high current in the starting current power line 220.

With the above disclosure in mind, the operation of the antitheft system 10 can be appreciated. A person can manipulate the enable signal generator 26 (FIG. 1) to generate an enable signal. The enable signal receiver 30 (FIG. 3) receives the signal and triggers the timer 32 to output voltages at its output ports $T_{out}^1$ and $T_{out}^2$ for the predetermined enable period defined by the time delay circuit described above.

In response to the output signal at the first output port $T_{out}^1$, the alarm transistor Q1 causes the alarm 34 to beep, indicating that the ignition system of the vehicle 200 is enabled. Simultaneously, in response to the output signal at the second output port $T_{out}^2$, the driver transistor Q2 and power switch transistor Q3 send a control signal to the power switch 20 to cause it to close.

While the power switch 20 is closed during the predetermined period, the ignition system of the vehicle 200 is enabled. Consequently, a person can engage the key 204 with the ignition switch 202 and start the engine 210 by turning the key 204. On the other hand, in the absence of an enable signal or after the predetermined period has elapsed, manipulation of the key 204 cannot start the vehicle 200, because the electrical path between the battery 206 and starter motor 208 is interrupted by the open power switch 20.

TABLE 1

| Component | Value (farads/ohms) |
|---|---|
| C1 | 10 μF |
| C2 | 10 μF |
| C3 | 47 μF |
| C4 | 47 μF |
| C5 | 10 μF |
| C6 | .01 μF |
| R1 | 1.1 MΩ |
| R2 | 180 KΩ |
| R3 | 10 KΩ |
| R4 | 470Ω |
| R5 | 470Ω |
| R6 | 240Ω |
| R7 | 240Ω |
| R8 | 75Ω |
| R9 | 1 KΩ |

As mentioned above and as shown in greater detail in reference to FIGS. 5A and 5B, an antitheft system, generally designated 400, for holding the power switch and accompanying circuitry of the present invention can be suspended between and thereby supported by a battery power line and a starter motor power line. This support can be exclusive, or in addition to other support means, e.g., brackets and the like. The antitheft system 400 is in all essential respects identical to the system 10 shown in FIGS. 1–3, with the exceptions noted below.

In the embodiment shown in FIG. 5A, a starting current power line, generally designated 402, which is in all essential respects identical to the starting current power line 220 shown in FIG. 1, can be cut near (i.e., within a few inches of) a starter motor "STARTER" having a solenoid "S" combined integrally therewith to establish a battery power line 404 and a starter motor power line 406. It will be appreciated that the starter motor power line 406 is electrically connected to the starter motor windings via the starter switch of the solenoid "S", and the starter motor power line is coupled to the housing. Also, the battery power line 404 is electrically connected to a battery "BATTERY" and mechanically coupled to the system 400, such that the system 400 is supported only by the power lines 404, 406.

In some vehicles, the solenoid "S" is not physically combined with the starter motor, but the above-disclosed combination of structure can nevertheless be used. FIG. 5B shows schematically shows such a vehicle, wherein a starting current power line, generally designated 408, is cut between a solenoid "S" and a starter motor "START" to establish a battery power line 410 and a starter motor power line 412. It will be appreciated that the starter motor power line 412 is electrically connected to the starter motor windings, and the starter motor power line 412 is coupled to the housing. Also, the battery power line 410 is electrically connected to a battery "BATTERY" via the starter switch of the solenoid "S" and is mechanically coupled to the system 400, such that the system 400 is supported only by the power lines 410, 412.

Now referring to FIG. 6, the details of the system 400 schematically shown in FIGS. 5A and 5B, can be seen. An elongated, parallelepiped-shaped copper or copper-alloy input bus bar 414 is attached to a first flat, parallelepiped-shaped, electrically insulative circuit board 416 at a first surface 416*a* of the circuit board 416. Plural type TO220 or type IRL3705N MOSFETs 418 are soldered to or otherwise held against the input bus bar 414 in electrical contact therewith. In the preferred embodiment, five MOSFETs 418 are soldered to a first long vertical side 420 of the input bus bar 414, and five MOSFETs 418 are soldered to a second long vertical side 422 of the input bus bar 414, it being readily understood in reference to FIG. 6 that the first long side 420 is opposed to the second long side 422. The MOSFETs preferably are L-channel MOSFETs to conserve energy consumption.

In turn, the MOSFETs 418 are in electrical contact with, and preferably in direct physical contact with, a flat, U-shaped, relatively wide (e.g., about five to ten millimeters in width "W"), electrically conductive trace 424 that is embedded in the first circuit board 416 near the first surface 416*a*. Moreover, the trace 424 is electrically connected to and is preferably in physical contact with a copper or copper-alloy parallelepiped-shaped output bus bar 426. Preferably, the trace 424 is made of copper having a thickness of about fourteen thousandths of an inch (0.014"). The skilled artisan will recognize that the trace 424 has a thickness about ten times normal, to enable the trace 424 to carry high starting current.

As shown in FIG. 6, the input bus bar 414 is formed with a central battery channel 428 that is parallel to the sides 420, 422 of the bus bar 414. Also, the output bus bar 426 is formed with a central starter motor channel (not shown in FIG. 6) that is generally colinear with the battery channel 428.

Per the present invention, either one of the battery power lines 404, 410 shown in FIGS. 5A and 5B is advanced into the battery channel 428 in electrical contact therewith. Then, two input set screws 432, 434 that are oriented perpendicular to the battery channel 428 and that are threadably engaged with the input bus bar 414 are tightened against the battery power line. In the preferred embodiment, one of the input set screws 432, 434 has a relatively blunt end for crushing the conductor in the power line to promote electrical contact therebetween, and the other input set screw 434, 432 has a relatively pointed end for piercing the insulation of the battery power line and thereby firmly holding the power line in the battery channel 428. Similarly, either one of the starter motor power lines 406, 412 shown in FIGS. 5A and 5B is advanced into the starter motor channel in electrical contact therewith. Then, two output set screws 436, 438 that are oriented perpendicular to the channel and that are threadably engaged with the output bus bar 426 are tightened against the starter motor power line. In the preferred embodiment, one of the output set screws 436, 438 has a relatively blunt end, and the other output set screw 438, 436 has a relatively pointed end for piercing the insulation of the starter motor power line and thereby firmly holding the power line in the starter motor channel and, hence, holding the device 400 in suspension between the battery power line and starter motor power line. Prevailing torque compound can be deposited on the screws 432, 434, 436, 438 to prevent the screws from loosening under vibratory loads.

With the above disclosure in mind, the system 400 shown in FIG. 6 incorporates a solid state power switch that is established by the MOSFETs 418, for selectively connecting either one of the batteries shown in FIGS. 5A and 5B with the windings of the associated starter motor. As intended by the present invention, the circuit board 416 is separated from a second circuit board 439 by an air gap, with the second circuit board 439 defining a second surface 439*a* that is opposite the first surface 416*a*.

The distance between the first and second surfaces 416*a*, 439*a* is about five millimeters (5 mm). Electronic control circuitry for controlling the power switch is mounted on the second surface 439*a*, such that the electronic circuitry is sufficiently insulated from the relatively high amperage in the trace 424, near the first surface 416*a*. This electronic circuitry can be substantially identical to the circuitry shown in FIG. 2, or it can be the circuitry shown in FIGS. 11–15. Moreover, to further shield the logic circuits on the second surface 439*a* from the effects of the high current in the bus bars, a ground plane 440 can cover the second surface 439*a*. The circuit boards 416, 439 with associated structure described above are enclosed in a plastic housing having first and second halves 439*a*, 439*b* that can be engaged with each other using threaded fasteners or that can be otherwise sealed together.

Figure 7:
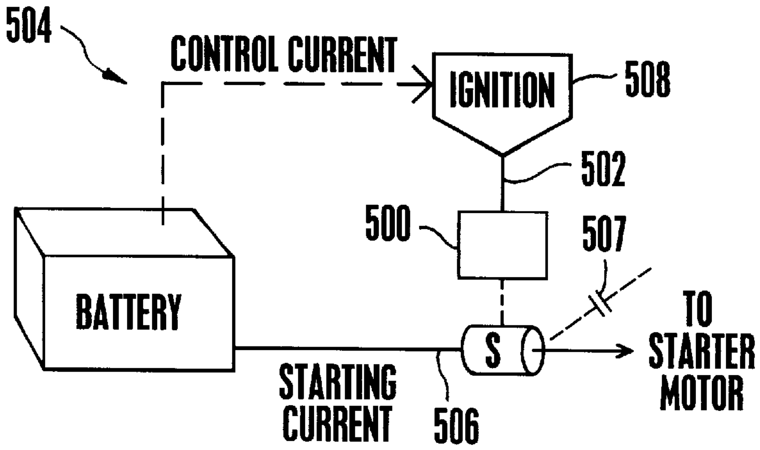
FIG. 7 is a schematic view of the present antitheft device incorporated in the control current line of a starter solenoid, showing the control current line in phantom.
Figure 8:
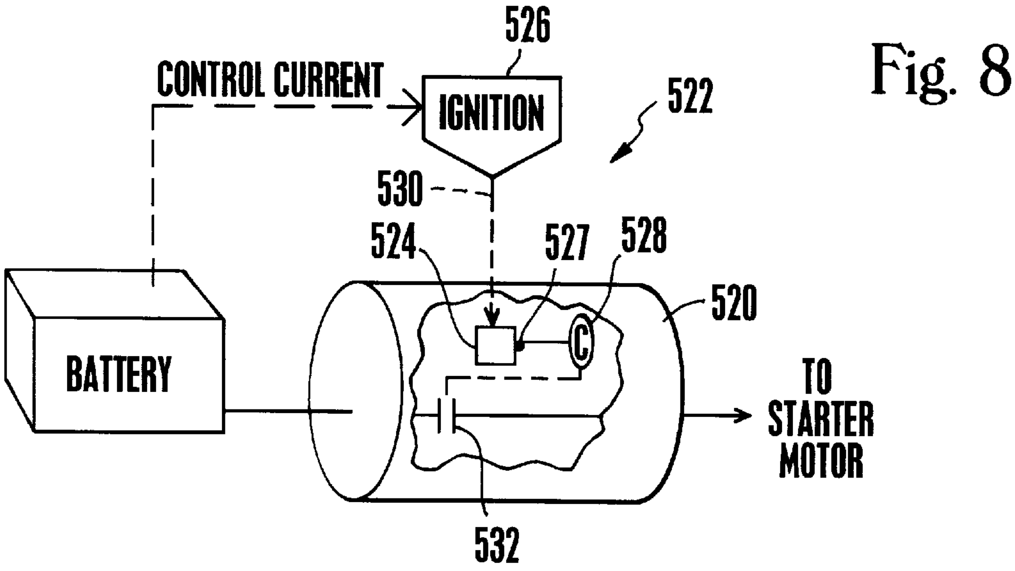
FIG. 8 is a schematic view of the present antitheft device incorporated in the starter solenoid housing, showing the control current line in phantom.

FIGS. 7 and 8 show that instead of incorporating the present vehicle antitheft device in the starting current power line of a vehicle, it may instead be installed in the control current power line of a starter solenoid, either externally to the solenoid housing (FIG. 7) or internally to the solenoid housing (FIG. 8). With respect to FIG. 7, an antitheft device 500 is installed in series with and supported by a solenoid control current power line 502 in a vehicle, generally designated 504. The vehicle 504 includes a battery as shown that sends high amperage (2000 or so amperes) to a starter motor via a starting current power line 506 and a starter solenoid "S", when the starter solenoid "S" has been energized to close a solenoid contact 507 in response to an ignition signal from the ignition 508 of the vehicle 504.

It is to be understood that the antitheft device 500 shown in FIG. 7, is in all essential respects identical in operation to the antitheft device 400 shown in FIG. 6, with the exception that only a single MOSFET need be used as the power switch, owing to the relatively low amperage of the control current vis-a-vis the starting current. Also, the input and output busses of the device 500 shown in FIG. 7 need not be as heavy duty as the busses shown in FIG. 6, again owing to the relatively low amperage of the starter solenoid control current. Indeed, the input and output busses can be connectors defining channels and having retainers for holding wire in the channels. Thus, with the present invention, the antitheft device 500 must receive an authorized enable signal to close its power switch, to permit operation of the ignition 508 to start the vehicle. In the absence of an enable signal, operation of the ignition 508 will not start the vehicle, because no control current can flow to the solenoid "S". FIGS. 20 and 21 below show particularly preferred embodiments of the device 500.

FIG. 8 shows that the present antitheft device can be incorporated into a starter solenoid housing 520 of a vehicle, generally designated 522. More particularly, an antitheft device 524 that is in all essential respects identical in operation to the antitheft device 500 shown in FIG. 7 is positioned in the solenoid housing 520 in electrical series between an ignition 526 of the vehicle 522 and an input terminal 527 of an activating coil 528 in the solenoid housing 520. In accordance with well-known means, the activating coil 528, when energized by control current from a vehicle battery via a control current power line 530 in response to the ignition 526, closes a solenoid contact 532 to thereby complete an electrical path from the battery to the starter motor of the vehicle 522. As can be appreciated in reference to FIG. 8, with the present invention, the antitheft device 524 must receive an authorized enable signal to close its power switch, to permit operation of the ignition 526 to start the vehicle. In the absence of an enable signal, a path for electrical communication to the coil 528 does not exist; hence, no control current can energize the coil 528 and, thus, the solenoid contact 532 will remain open. FIG. 19 below shows a particularly preferred implementation of the device 524.

In addition to the above inventive structure, the present invention permits a user to tailor any one of the antitheft devices disclosed herein to operate in response to a user-selected enable signal generator. Accordingly, the present invention can incorporate a computer program device, such as, e.g., an application specific integrated circuit or other logic device that can be associated with the present control circuit, to "train" the antitheft device to actuate upon receipt of one of a plurality of user-defined enable signal codes. The computer program may be executed by a processor, such as one or both of the processors shown below in FIG. 13, within the control circuit as a series of computer-executable instructions. These instructions may reside, for example, in RAM or ROM. Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C or $C^{++}$ compatible code, or appropriate machine code.

Figure 10:
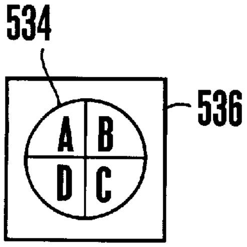
FIG. 10 is a schematic rendering of a computer program device.
Figure 9:
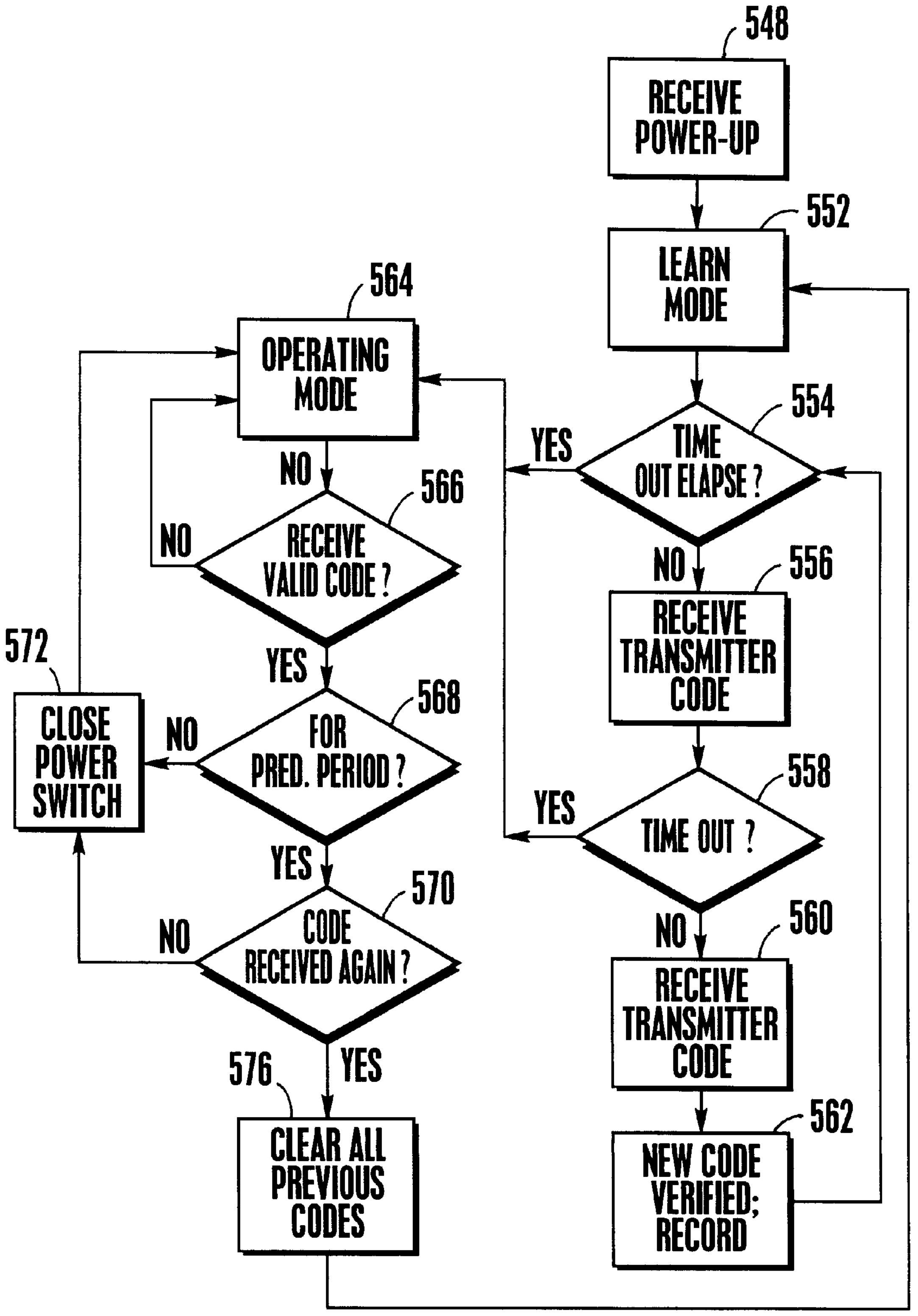
FIG. 9 is a flow chart showing the logic of the present invention in programming the control circuit to receive one of a plurality of user-selected transmitter signals.

FIG. 9 illustrates the structure of such instructions as embodied in a computer program. Those skilled in the art will appreciate that FIG. 9 illustrates the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the FIGS. The machine component is shown in FIG. 10 as a combination of program code elements A–D in computer readable form that are embodied in a computer-usable data medium 534, on a computer diskette 536. As mentioned above, however, such media can also be found in semiconductor devices, on magnetic tape, and on optical disks.

Commencing at block 548 of FIG. 9, the device is connected as discussed above to a power source, preferably a vehicle battery. The logic then moves to block 552, wherein the device enters a learn mode. In an alternate embodiment, the logic can determine whether the power up is the initial power up, and permit entering the learn mode at block 552 only when the power up is the initial power up or upon reception of a previously authorized code, as an added measure of security.

In the learn mode, a user can generate one or more enable signal codes from one or more enable signal generators that the user might want to use to operate the present antitheft system, including a remote generator such as the generator 26 shown in FIG. 1. After entering the learn mode, a timer is started and, if it is determined at decision diamond 554 that a predetermined time out period has not elapsed, a transmitter code is received at block 556 as a proposed enable signal. To designate the proposed enable signal as an authorized enable code, the proposed enable signal must be received a second time within a predetermined time out period. Thus, after the first receipt of a proposed enable signal, program control continues to decision diamond 558, wherein it is determined whether another predetermined time our period has elapsed. When a second transmission of a proposed enable signal is received within the time out period, the process moves to block 560 to receive the second transmission and then record the proposed enable signal as a verified, authorized enable code at block 562. The process then loops back to decision diamond 554 to record additional enable codes, if desired, or to time out and exit the learn mode. It is to be understood that as mentioned above, during the first entry of the learn mode, a bit can be set indicating that the device has experienced an initial power up, if desired, as an added measure of security. As shown in FIG. 9, when the device times out of the learn mode from decision diamonds 554, 558, the device enters the operating mode at block 564.

From block 564, program control resumes at decision diamond 566 wherein it is determined whether a valid (i.e., authorized) enable code has been received. When such an authorized code has been received, program control resumes at decision diamond 568 to determine whether the code has been received continuously for a predetermined period, i.e., whether the user has evinced a desire to enter the learn mode by continuously depressing the transmitter button or key. When the test at decision diamond 568 is positive, the logic moves to decision diamond 570 to determine whether the code has been received again within a predetermined time out period, as verification that the user wants to enter the learn mode. It is to be understood that light emitting diodes (LEDs) can be mounted on the device 400 and illuminated periodically to present a visual signal that the logic has received the first signal at decision diamond 568. Once the second (verification) signal is received at decision diamond 570, the LEDs can be illuminated continuously to indicate entry into the learn mode.

If the user did not depress the transmitter key sufficiently long to achieve a positive test at decision diamond 568, or if the user did not key the transmitter a second time to verify entering the learn mode at decision diamond 570, the logic proceeds to block 572 to close the power switch, and then the logic moves back to block 564. On the other hand, if the verification is determined as being received at decision diamond 570, the logic moves to block 576 to clear all previous codes, and then the logic moves to the learn mode at block 552.

FIGS. 11–15 are schematic diagrams of the circuitry of the device 400 shown in FIG. 6. It is to be understood that the components shown in FIGS. 11–15 can be physically mounted on the second circuit board 439 shown in FIG. 6. It is to be further understood that FIGS. 11–15 use conventional symbols to depict the various circuit components, with the circuit components being generically labelled as appropriate and shown with accompanying preferred component values. Also, manufacturers names are shown in parentheses in FIGS. 11–15 where appropriate, adjacent the component corresponding to the manufacturer, as are manufacturer part numbers. Values of resistors are given in Ohms and values of capacitors are given in microFarads unless otherwise noted.

FIG. 11 shows the circuitry of the MOSFETs 418 shown in FIG. 6. In FIG. 11, the MOSFETs 418 are labelled Q1–Q10, and are shown electrically connected to the trace 424. A snubber circuit 580 can be provided as shown in accordance with well-known principles.

Figure 13:
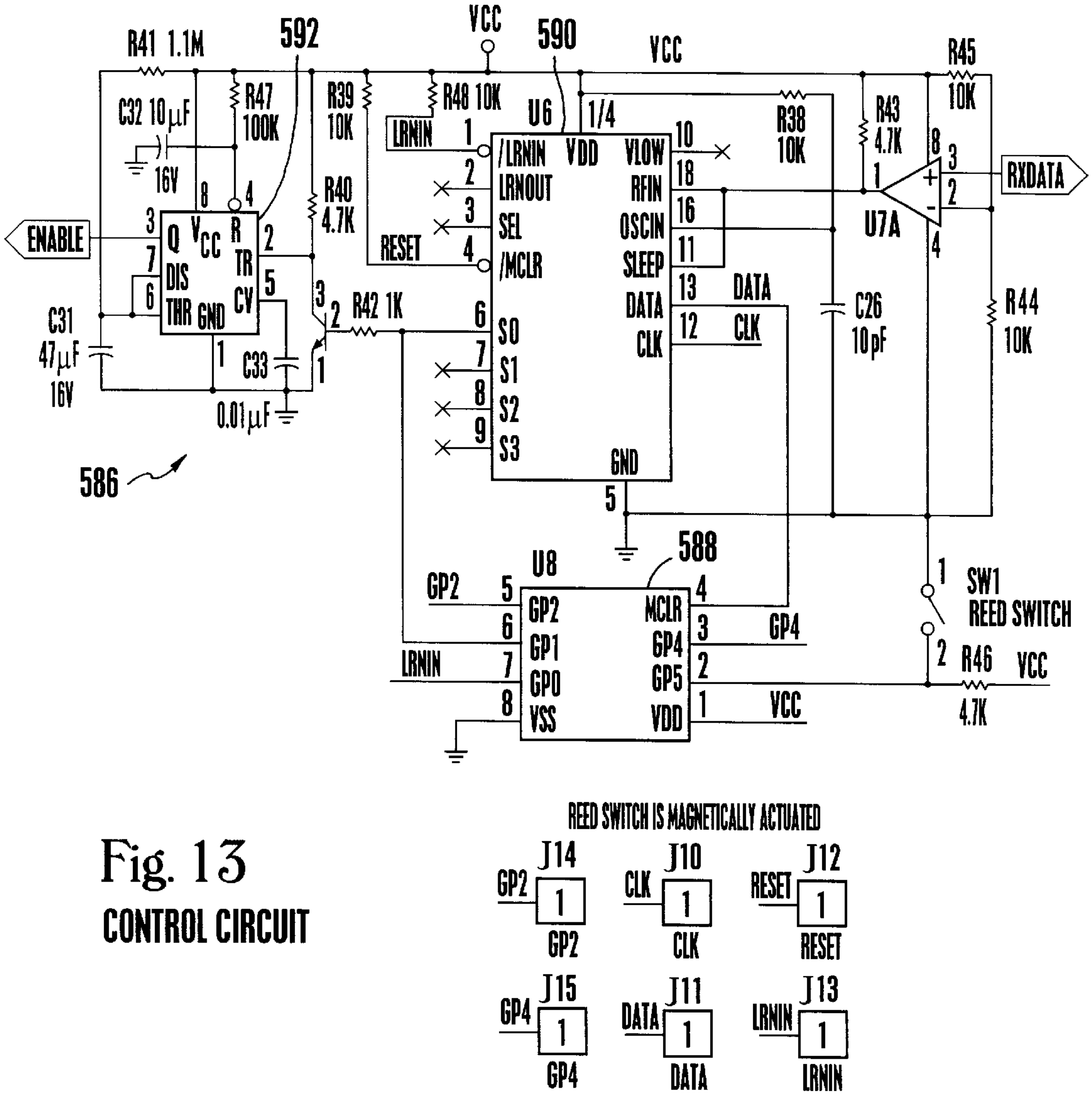
FIG. 13 is an electrical schematic diagram of the control circuit for the device shown in FIG. 6.

FIG. 12 shows an exemplary power supply circuit 582 that can be used to provide five volt dc (5 vdc) voltage $V_{cc}$ to the circuitry shown in FIGS. 13 and 14. Like the circuit shown in FIG. 3, the circuit shown in FIG. 12 can include a voltage regulator 584, preferably a type MIC2954-03BS regulator made by Micrel, to ensure that the control circuitry discussed below is supplied a constant five volts stepped down from the vehicle battery that is connected at the junction labelled "J1" in FIG. 12.

FIG. 13 shows an exemplary control circuit 586 that includes a master microprocessor 588 which controls a slave microprocessor 590 in response to, among other things, signals received at a junction labelled "RXDATA" in FIG. 13. The microprocessors 588, 590 respectively can be a type PIC12C509 microchip and a type HCS512-I/SO microchip that operate in accordance with the logic shown in FIG. 9 to control the device 400 shown in FIG. 6. It is to be understood that the present rf receiver (e.g., the receiver 30 discussed above) is connected to the junction "RXADATA", and the control circuit 586 outputs control signals to the gate control circuit shown in FIG. 14 at a junction labelled "ENABLE" in FIG. 13 in accordance with the principles discussed above. The control circuit 586 includes a timer 592 as shown, preferably a type ICM7555ID timer made by Phillips Electronics Corp.

FIG. 14 shows an exemplary gate control circuit 594 that receives signals from the control circuit 586 shown in FIG. 13 at the junction labelled "ENABLE" for controlling the gates of the MOSFETs 418 shown in FIGS. 6 and 11. As shown, the gate control circuit 594 includes a feedback outcontrol chip 596 made, in one preferred embodiment, by Texas Instruments under the part number TL494ID. When the antitheft device is not actuated, e.g., during periods when the time delay circuit has timed out after the elapse of the predetermined enable period, the gate control circuit 594 is isolated from the battery to ensure that the MOSFETs cannot be partially on. Although FIG. 14 shows that this isolation can be accomplished by an isolation device such as a transformer "T", referring briefly to FIG. 18 in the presently preferred embodiment the isolation device is established by a solid state chip labelled "isolation", preferably a type MIC2954 chip.

FIG. 15 shows a noise suppression and adaptive slicer circuit 600 that includes a two-stage operational amplifier as shown, and various noise suppression elements as shown, for increasing the operational range of the preferred receiver 30. A first lead 602 of the noise suppression and adaptive slicer circuit 600 is connected to the DF2 pin (pin #22) of the preferred Plessey receiver, and a second lead 604 of the noise suppression and adaptive slicer circuit 600 is connected to the DSN pin (pin #10) of the preferred Plessey receiver.

Figure 16:
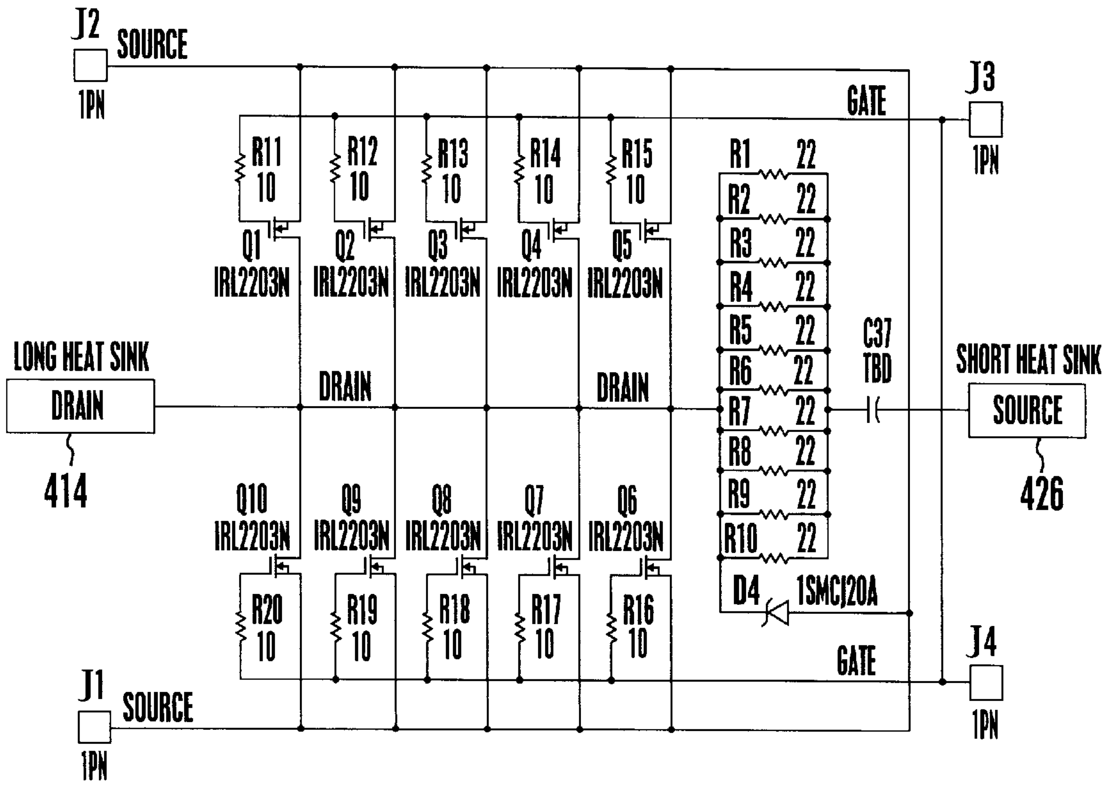
FIG. 16 is an alternate electrical schematic diagram of the power circuit.
Figure 17:
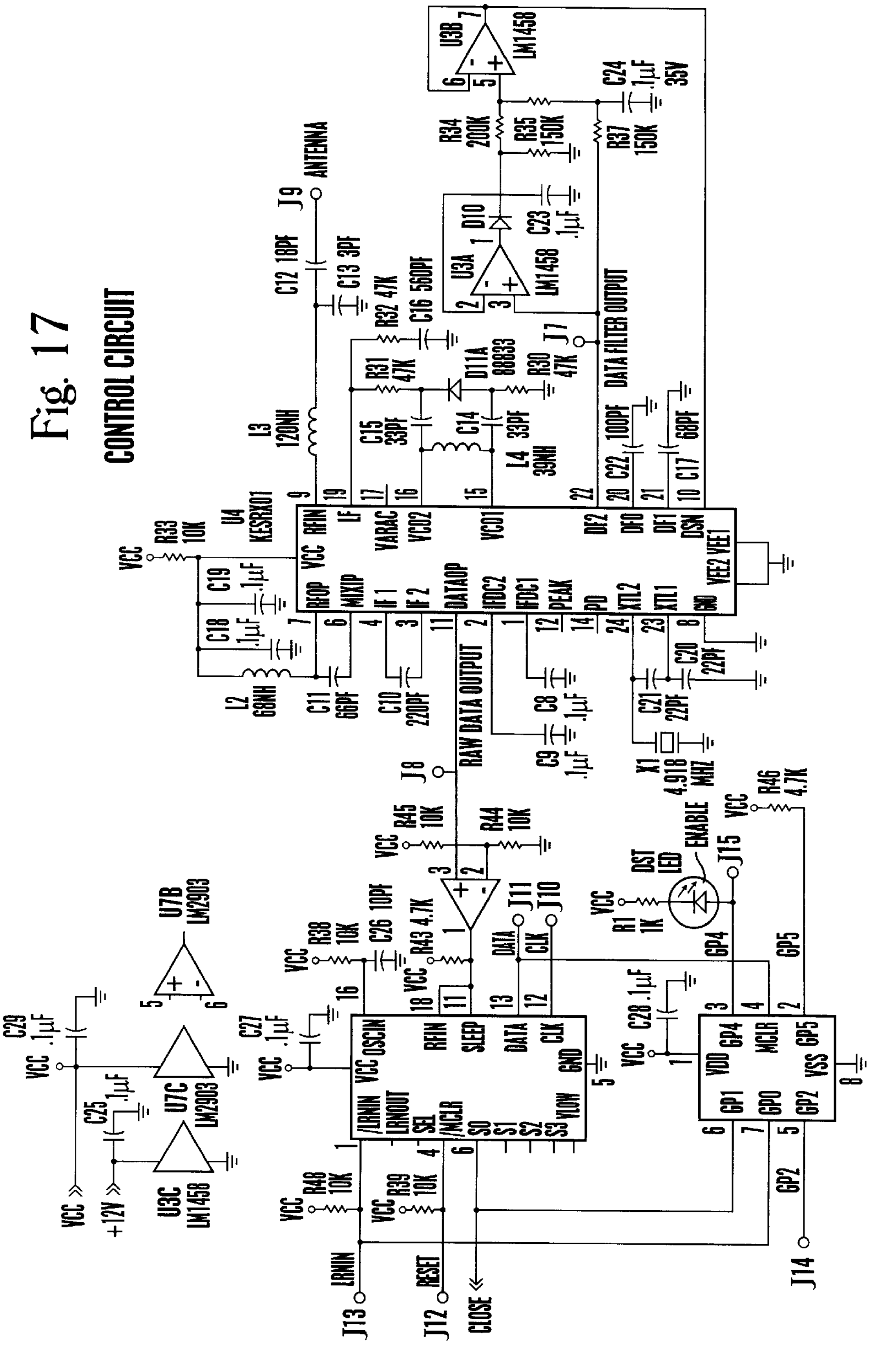
FIG. 17 is an alternate electrical schematic diagram of the control circuit.
Figure 18:
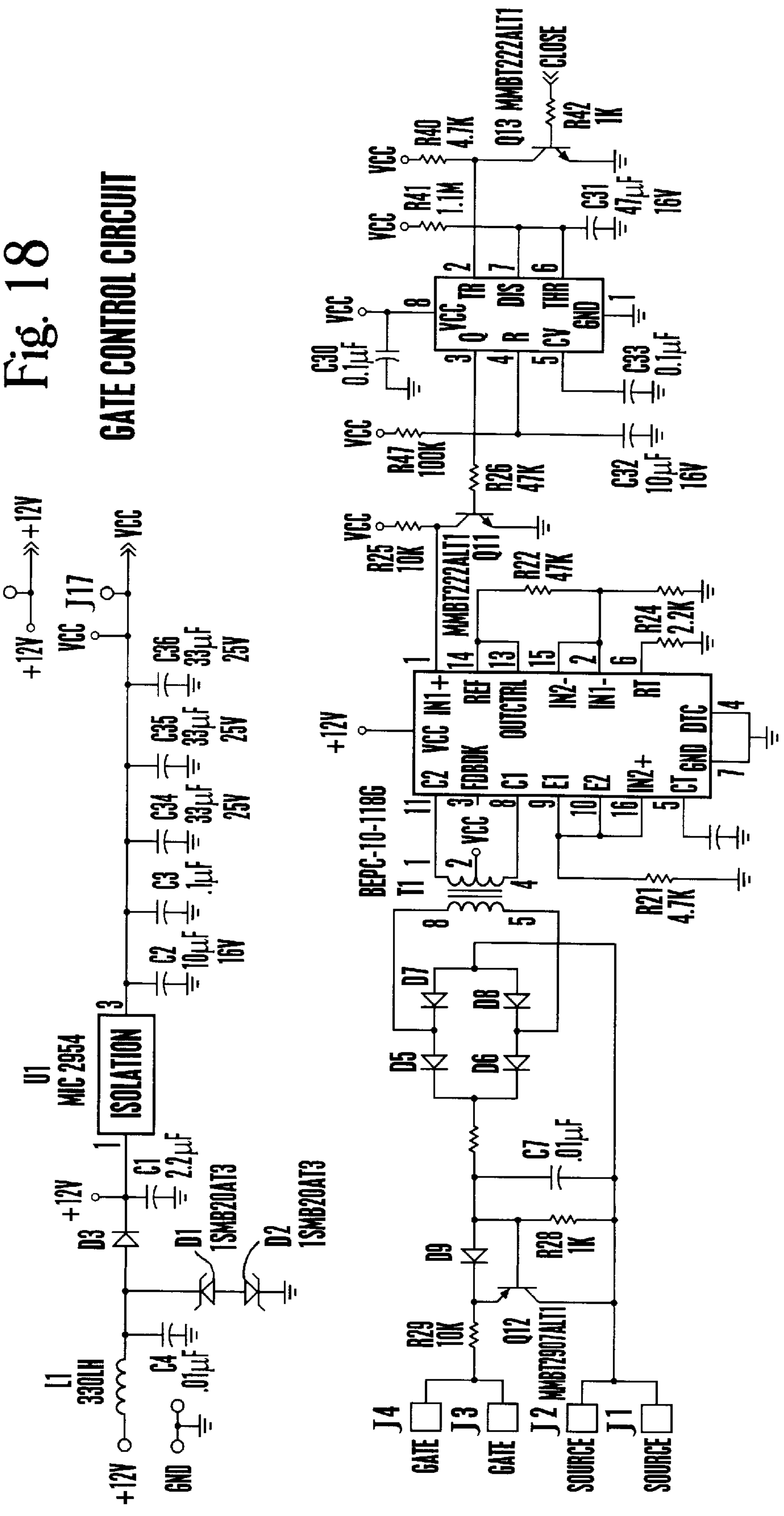
FIG. 18 is an alternate electrical schematic diagram of the gate control circuit.

FIGS. 16, 17, and 18 show alternate, presently preferred embodiments of the power board, control logic as implemented on a logic board, and gate control logic as implemented on a logic board. Included in the power board shown in FIG. 16 is a transient voltage suppressor (TVS), such as a Zener diode "D4" or other voltage spike suppressor, to protect the power components from damage from voltage spikes. Similarly, one or more TVS, such as TVS Zener diodes "D1", "D2" shown in FIG. 18, can be provided to protect the logic components from transient voltage spikes. An enable component, labelled "enable" in FIG. 17 and depicted as an rf receiver, is provided to establish an enable signal as set forth above. As discussed in relation to FIG. 21 below, however, the "enable" component alternatively can be established by an impulse logic circuit.

FIG. 19 shows a presently preferred embodiment of the in-solenoid system shown schematically in FIG. 8. As shown, a starter solenoid 700 includes a solenoid cap 702 that is attached to a solenoid housing 704 in accordance with well-known principles. The solenoid cap 702 includes a metal motor connector 706 and metal battery connector 708 that are electrically connected to a vehicle starter motor and vehicle battery, respectively in accordance with principles known in the art. Also, the solenoid cap 702 includes a metal ignition switch wire attachment 710 that is electrically connected to an ignition switch of a vehicle. On the other hand, the solenoid housing 704 includes a solenoid plunger 712, the function of which is well-known, and a solenoid coil control wire 714, which is electrically connected to a solenoid contact such as the contact 532 shown in FIG. 8.

With the above disclosure in mind, an antitheft interrupt device such as the device 524 shown and described above is electrically interposed between the ignition switch wire attachment 710 and solenoid coil control wire 714 in electrical series with the ignition system of the vehicle and the solenoid contact within the solenoid housing 704. In the embodiment shown in FIG. 19, the device 524 includes a circuit board or substrate 716, at least one logic chip 718 mounted thereon, and at least one power switch 720, preferably a single MOSFET, mounted on the circuit board or substrate 716 and operable by the logic chip 718 in response to a user signal to selectively open and close the electrical path between the ignition system and the solenoid contact in accordance with principles disclosed above.

In addition to the logic of the present invention for selectively enabling current to pass through the power switch 720 and thereby activate the solenoid 700 to permit starting an associated vehicle, the chip 718 of the present invention can include logic for generating control signals for undertaking other functions. In other words, the chip 718 that is contained in the solenoid housing 704 can include logic for generating plural control signals useful for undertaking respective plural functions.

The chip 718 can receive plural command signals from, e.g., the hand-held signal generator 26 (FIG. 1) or from one or more sensors 719 or other control components that can be mounted on the substrate 716 or elsewhere in the vehicle. In response to the command signals, the chip 718 generates control signals that are used by other vehicle components such as alarms and control circuits as described below in reference to FIG. 19A. These control signals, when more than one is to be generated, can be multiplexed over a single wire to other control components such as the vehicle's engine control unit (ECU), to enable the functions to be undertaken nearly simultaneously with each other.

FIG. 19A shows the additional functionality logic of the chip 718 in flow chart format, for ease of disclosure, as might be embodied in computer software. It is to be understood, however, that the logic can be embodied in discrete logic circuits on the chip 718.

Plural command signals can be received at receive blocks 1000, 1002 by the chip 19A. As can be appreciated in reference to block 1000, the hand-held generator 26 can be used to generate a command signal for closing the power switch 720, as fully discussed above. In response, as can be appreciated in reference to generate block 1004, the logic of the chip 718 generates a control signal to cause the power switch 720 to close. This is an example of one function that can be undertaken by the logic of the in-solenoid chip 718.

Moreover, the hand-held generator 26 can be used to generate additional command signals for additional functions, as indicated at block $\mathbf{1000}_n$. For example, by providing plural buttons on the generator 26 or by toggling a single button multiple times, additional command signals can be transmitted to the chip 718 to cause the chip 718 to generate additional control signals. As but one example, a command signal can be generated to cause the chip 718 to generate a control signal for starting the vehicle by, e.g., closing a switch in to bypass the vehicle's ignition switch, thereby providing battery power at the solenoid. Subsequent closing of the power switch 720 in response to a power switch close command signal would then result in starting the engine. In this way, a person could not only enable starting of the vehicle as the person approaches the vehicle, but can also start the engine remotely. Or, a command signal can be generated to cause the chip 718 to generate a control signal to a global positioning satellite (GPS) system on the vehicle, to cause the GPS system to transmit or receive positioning signals from a satellite. Still further, a command signal can be generated by a person inside the vehicle when it is operating to cause the engine to stop, essentially in the reverse of the remote start sequence discussed above, in case of, e.g., a carjacking. Indeed, the generator 26 can be used to generate command signals to cause the chip 718 to disable any number of vehicle systems. During these functions, the chip 718 can control the lighting system of the vehicle as appropriate.

As mentioned above, in addition to receiving command signals from the hand-held generator 26, the chip 718 can receive command signals from sensors 719 or control circuits as indicated at block 1002. For example, a motion sensor can be provided in the solenoid housing or elsewhere on the vehicle to detect motion and/or impact of the vehicle. The motion sensor, which could be a radar-implemented sensor or other sensor, would generate a command signal in response, and upon receipt of the command signal, the chip 718 generates a control signal to, e.g., activate an alarm or other control circuit as appropriate on the vehicle, e.g., the control signal can be used to activate the lights and horn of the vehicle. Similarly, a vehicle tilt sensor can send a command signal to the chip 718 when the vehicle is unduly tilted, to cause the chip 718 to generate a control signal that can be used by alarm or other control circuitry as appropriate.

In addition to the above, the chip 718 can receive command signals from control circuits of the vehicle to undertake still further functions. As but a few examples, the chip 718 can receive a battery voltage signal and when the voltage is too low, the chip 718 can generate a control signal to cause a "low voltage" warning light to illuminate, or to cause a voltage meter to indicate low battery voltage. Moreover, under low battery voltage conditions the chip 718 can generate a control signal that can be used to open a switch in the main battery power supply line, to prevent unwanted battery drain when the vehicle is not operating. In this case, if desired the main vehicle power distribution can be undertaken by appropriate circuitry within the solenoid, with the anti-battery drain switch being located in the solenoid. In its voltage sensing role, the chip 718 can also generate control signals when voltage spikes are sensed, to regulate and protect against such spikes. The functions above that are in addition to the solenoid enablement function are exemplary and in no way intended to be invention-limiting examples.

FIGS. 20 and 21 show particular embodiments of the device 500 shown in FIG. 7. The devices shown are solenoid control current interrupt devices that are after market versions of the present invention for interrupting control current to a starter solenoid, and that can be operated by means of the above-described rf enable signal generator or by means of impulse signals.

More specifically, as shown in FIG. 20, a device 800 that is in all essential respects identical to the device 500 shown in FIG. 7 includes system housing that in one embodiment includes upper and lower hollow plastic halves 802, 804. The halves 802, 804 mate in a snapping fit or in another interference fit, and the lower half 804 is provided with engagement ribs 806 for this purpose. The halves 802, 804 can also be held together by fasteners such as screws. According to present principles, the system housing is mounted on or very near the starter solenoid of a vehicle and is electrically connected to the solenoid to selectively complete the solenoid current path when a user manipulates a portable hand-held rf signal generator.

FIG. 20 shows that the device 800 includes a power board 808 that is parallel to and connected to a logic board 810. The circuit boards 808, 810 hold electrical circuits described above, e.g. the circuits shown in FIGS. 16–18. On the power board 808 is a solenoid current wire connector 812 that can be electrically connected to the control line for the solenoid, such as the line 502 shown in FIG. 8. Also, an operating current connector 814 is on the circuit board for receiving a 12 volt circuit power signal (from, e.g., the vehicle battery) in a cavity 816, and a ground wire can be connected to a cavity 818 of the connector 814. The electrical components of the connectors 812, 814 are connected to appropriate components on the boards 808, 810 for operation as described above.

FIG. 21 shows a device 900 that is in all essential respects identical to the device 800 shown in FIG. 20, except that the enable signal in the device 900 is not provided by an rf signal, but rather by at least one impulse signal generated by a component of the vehicle in which the device 900 is installed. The device 900 includes upper and lower hollow plastic halves 902, 904 that are mounted on or very near the starter solenoid of a vehicle and that are identical to the halves 802, 804 shown in FIG. 20. Also, the device 900 includes a single circuit board 906 that holds the power and logic circuits described above, e.g. the circuits shown in FIGS. 16–18, it being understood that the device in FIG. 17 labelled as "enable" is not an rf receiver circuit but rather an impulse logic circuit that operates as discussed below, when incorporated into the device 900 shown in FIG. 21. A solenoid current wire connector 912 and an operating current connector 914 that are identical to the connectors 812, 814 shown in FIG. 20 are also provided.

In accordance with present principles, an impulse connector 916 includes an enable port 918 that can receive an enable signal from a built-in conventional alarm system of a vehicle and that sends the signal to the circuit board 906 to establish the present enable signal. As disclosed previously, upon receipt of the enable signal the MOSFET is gated "on", such that current is permitted to flow through the MOSFET of the device 900 to the vehicle solenoid.

As an alternative means to establish the present enable signal in vehicles that do not have built-in conventional alarm systems, a first impulse port 920 can be provided to receive a grounded lead, or a 12 volt impulse signal from a vehicle component, or an interlock signal from a vehicle component, such as a door. More specifically, the first impulse port 920 can be electrically connected to a conventional electrical circuit of a door latch lock of the vehicle, and when the door is unlocked (either by using a key from outside the vehicle or by manipulating a door lock mechanism inside the vehicle), the conventional door latch lock circuit generates a signal that is received at the first impulse port 920.

Furthermore, the impulse connector 916 includes a second impulse port 922. The second impulse port 922 is electrically connected to a vehicle component for receiving a signal therefrom. In one preferred embodiment, the second impulse port 922 is electrically connected to an interior door lock mechanism, such that when the interior door lock mechanism is manipulated, the second impulse port 922 receives a signal. The impulse ports 920, 922 are electrically connected to the electrical components on the circuit board 906, and in particular to the present processor or processors for operation described below.

Figure 22:
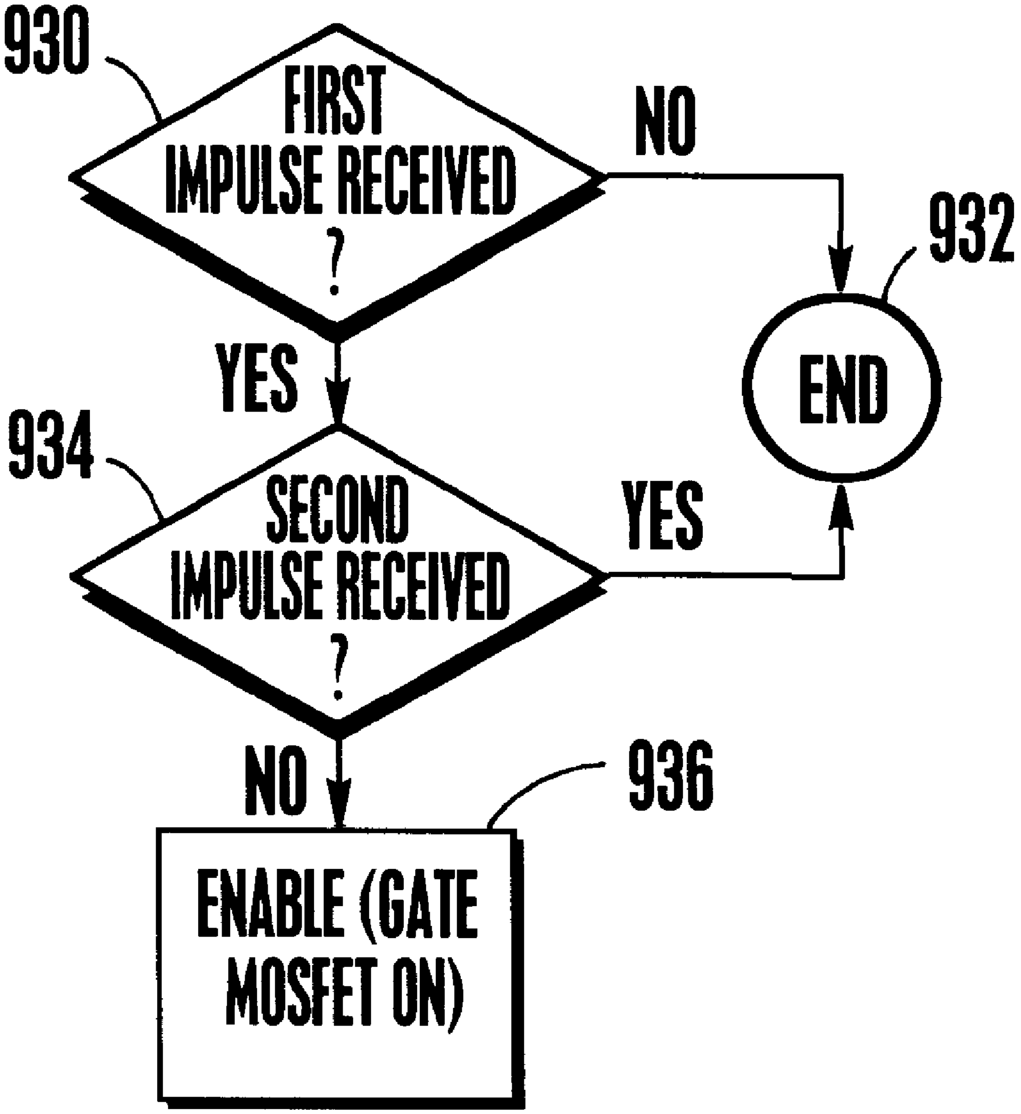
FIG. 22 is a flow chart of the logic of the impulse-operated solenoid device.

With the above disclosure in mind, the logic of the device 900 can be appreciated in reference to FIG. 22. Commencing at decision diamond 930, it is determined whether the first impulse signal has been received at the first impulse port 920. If not, the logic ends at state 932. On the other hand, when the first impulse signal is received, the logic flows to decision diamond 934 to determine whether a second impulse signal has been received at the second impulse port 922. If it has, the process ends at state 932, but otherwise the process moves to block 936 to gate the MOSFET on to permit current to flow to the solenoid (and, thus, to permit starting the vehicle). Accordingly, the device 900 enables starting the vehicle after a person unlocks a door by using a key (which produces only the first impulse signal), and not when a thief breaks into the vehicle and unlocks a door by manipulating an interior door lock mechanism (which produces both impulse signals).

While the particular IN-SOLENOID CHIP FOR UNDERTAKING PLURAL FUNCTIONS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A starter solenoid, comprising:

a solenoid housing; and a chip mounted in the housing and being only in wireless communication with a user-manipulable input device for user activation, the chip including logic for outputting at least two control signals respectively useful for undertaking at least two vehicle functions, at least one of the functions not being related to starting the vehicle.

2. The starter solenoid of claim 1, wherein the chip receives command signals and generates the control signals in response thereto.

3. The starter solenoid of claim 2, wherein at least some command signals are received from a hand held command signal generator.

4. The starter solenoid of claim 2, wherein at least some command signals are received from sensors.

5. The starter solenoid of claim 1, further comprising:

an activating coil in the housing, the activating coil having an input terminal for receiving control current thereat, the chip communicating with an antitheft system including:

at least one MOSFET in electrical series with the input terminal of the activating coil for actuating the solenoid, the MOSFET being disposed in the solenoid housing, at least portions of the antitheft system being contained on the chip.

6. The starter solenoid of claim 1, wherein the control signals are selected from the group of control signals including: voltage regulation/control signals, voltage indication signals, remote start signals, multi-function disabling signals, positioning signals, low voltage protect signals, motion/impact alarm signals, tilt alarm signals, proximity signals, vehicle component control signals.

7. The starter solenoid of claim 1, wherein at least one of the control signals is a voltage regulation/control signal.

8. The starter solenoid of claim 1, wherein at least one of the control signals is a voltage indication signal.

9. The starter solenoid of claim 1, wherein at least one of the control signals is a remote start signal.

10. The starter solenoid of claim 1, wherein at least one of the control signals is a multi-function disabling signal.

11. The starter solenoid of claim 1, wherein at least one of the control signals is a positioning signal.

12. The starter solenoid of claim 1, wherein at least one of the control signals is a low voltage protect signal.

13. The starter solenoid of claim 1, wherein at least one of the control signals is a motion/impact alarm signal.

14. The starter solenoid of claim 1, wherein at least one of the control signals is a tilt alarm signal.

15. The starter solenoid of claim 1, wherein at least one of the control signals is a proximity signal.

16. The starter solenoid of claim 1, wherein at least one of the control signals is a vehicle component control signal.

17. A combined antitheft system and control signal generator system for a starter solenoid of a vehicle, the starter solenoid having a solenoid housing and an activating coil in the housing, the system comprising:

at least one power switch in electrical series with a terminal of the activating coil for actuating the solenoid upon receipt of an anti-theft control signal, the power switch being located in the housing; and a logic chip in the housing for generating the anti-theft control signal in response to only wireless communication of a command signal and for outputting at least one other control signal in addition to the anti-theft control signal.

18. The combined antitheft system and control signal generator system of claim 17, wherein the chip receives command signals and generates the control signals in response thereto.

19. The combined antitheft system and control signal generator system of claim 18, wherein at least some command signals are received from a hand held command signal generator.

20. The combined antitheft system and control signal generator system of claim 18, wherein at least some command signals are received from sensors.

21. The combined antitheft system and control signal generator system of claim 17, wherein the control signals are selected from the group of control signals including: voltage regulation/control signals, voltage indication signals, remote start signals, multi-function disabling signals, positioning signals, low voltage protect signals, motion/impact alarm signals, tilt alarm signals, proximity signals, vehicle component control signals.

22. A starter solenoid, comprising:

a solenoid housing;

an activating coil in the housing;

an antitheft system disposed in the solenoid housing, the antitheft system including:

at least one power switch in electrical series with the activating coil for actuating the solenoid in response to a first control signal from a chip, the chip receiving wireless command signals and not being connected via wire to a user-manipulable operating device; and the chip, the chip being disposed in the housing and containing at least a portion of the antitheft system, the chip generating at least a second control signal useful by a system other than the antitheft system.

23. The starter solenoid of claim 22, wherein the chip receives command signals and generates the control signals in response thereto.

24. The starter solenoid of claim 23, wherein at least some command signals are received from a hand held command signal generator.

25. The starter solenoid of claim 24, wherein at least some command signals are received from sensors.

26. The starter solenoid of claim 25, wherein the control signals are selected from the group of control signals including: voltage regulation/control signals, voltage indication signals, remote start signals, multi-function disabling signals, positioning signals, low voltage protect signals, motion/impact alarm signals, tilt alarm signals, proximity signals, vehicle component control signals.

* * * * *